United States Patent [19]

Amstad

[11] 4,176,594
[45] Dec. 4, 1979

[54] LIVE KNIFE ASSEMBLY

[75] Inventor: John H. Amstad, Alameda, Calif.

[73] Assignee: Atlas Pacific Engineering Company, Emeryville, Calif.

[21] Appl. No.: 851,640

[22] Filed: Nov. 15, 1977

[51] Int. Cl.² ............................................. A23N 7/00
[52] U.S. Cl. .................................. 99/593; 308/237 R
[58] Field of Search ................ 99/491, 540, 541, 574, 99/584, 590, 591, 593–599; 308/1 R, 237 R; 16/DIG. 27

[56] References Cited

U.S. PATENT DOCUMENTS

| 2,046,559 | 7/1936 | Javery et al. ..................... 308/237 R |
| 3,058,502 | 10/1962 | Loveland et al. ....................... 99/593 |

Primary Examiner—Harvey C. Hornsby
Assistant Examiner—Timothy F. Simone
Attorney, Agent, or Firm—Robert H. Eckhoff

[57] ABSTRACT

An improved live knife assembly construction is provided based on such assemblies as are shown in U.S. Pat. Nos. 3,058,502 (FIG. 8) and 3,277,941. The aforementioned patents are owned by the assignee of this invention and this application.

2 Claims, 3 Drawing Figures

U.S. Patent  Dec. 4, 1979  4,176,594

LIVE KNIFE ASSEMBLY

BACKGROUND OF THE INVENTION

Rotary type knife peelers are utilized for peeling such fruit as pears. The rotary knife cutter is moved over the surface of the fruit from one end to the other while the fruit is rotated. The knife is moved by a suitable mechanism into and out of engagement with the fruit as the knife cutter is rotating as it is moved over the surface of the pear.

SUMMARY OF THE INVENTION

The present knife construction is much lighter in weight which means that less pressure need be placed on the cutter to maintain the cutter in contact with the fruit as the rotary cutter follows the contour of the fruit. The practical advantage of this is that less flesh is removed from the fruit during the peeling, thereby increasing the yield of peeled fruit.

It is a feature of this invention that the guard utilized in association with the rotary cutting knife is made of a suitable plastic such as polypropylene. The guard is also utilized to serve as a combination guard and bearing for the shaft supporting the rotary cutter thus reducing the number of parts. The number of parts in the patented design made it very difficult to space the guard properly with respect to the knife because of the buildup of dimensional tolerances between all the parts. In the design of this invention, there is only one part between the cutter and the guard which makes it much easier to maintain the proper spacing.

In addition, the shape of the edge of the guard has been altered so that the possibility of the cutting depth changing with the shape of the fruit has been materially reduced. For example, in the old design, the guard was provided with a straight edge on the flange. If a fruit had a bump on it, the guard would ride up on the bump and, when the guard made contact between the straight flange and the fruit, the cutter would be moved away slightly with the result that there would be a skip in the peeling. In the present construction, the straight flange has been replaced with one having a radius so that when the guard contacts an odd shape, the radius will follow that odd shape closer than previously which results in a better peeling of the fruit.

It is in general the broad object of the present invention to provide an improved life knife assembly construction.

For convenience, the following description is provided of the prior art as shown in the aforementioned patents and as employed commercially.

Figure 3:
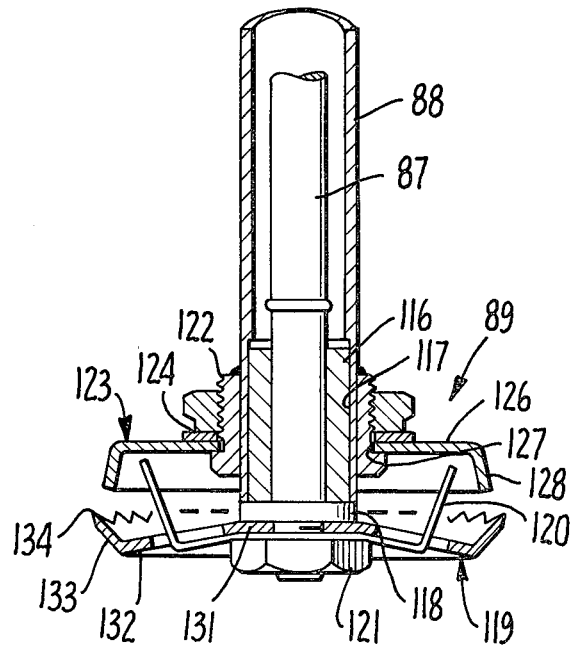
FIG. 3 is a section similar to FIG. 2 but showing the knife construction previously utilized.

The peeling cutter assembly 89 is mounted on an end of shaft housing 88 as is shown in FIG. 3. A bushing 116 fits in a counterbore 117 in housing 88 to act not only as a bearing for shaft 87 but also as a spacer and end thrust bearing. The lower extremity of shaft 87 is stepped down in diameter and threaded to provide a mounting for a bearing washer 118, rotary peeling knife 119, chip breaker 120 and lock nut 121. An outwardly flanged, exteriorly threaded sleeve 122 is affixed as by welding to housing 88 to provide for adjustably mounting a guard member 123, secured by a washer and nut 124. The guard 123 is of an inverted dish shape having a central planar portion 126, center hole 127 and a downwardly depending rim 128, with a segment cutaway to provide for controlled egress of the peelings as broken up by the chip breaker 120. The guard 123 is adjustably positioned with respect to rotary knife 119 so that the depth of cut of the knife can be altered and controlled.

The rotary knife element 119 is formed with a central planar portion 131 for attachment to drive shaft 87, an intermediate arcuate portion 132 and an upturned annular rim 133. The edge 134 of rim 133 is tapered and serrated to provide the necessary knife cutting surfaces for peeling a fruit. The rim 133 is provided at such an angle to the planar portion 131 that only the cutting edge of the rim contacts the fruit at any time. This angle is at least 155° and is preferably about 150°. What is desired is that the rim not ride on the fruit. If this occurs, one will not have the proper peeling action of the knife.

DESCRIPTION OF THE PREFERRED EMBODIMENT

Figure 1:
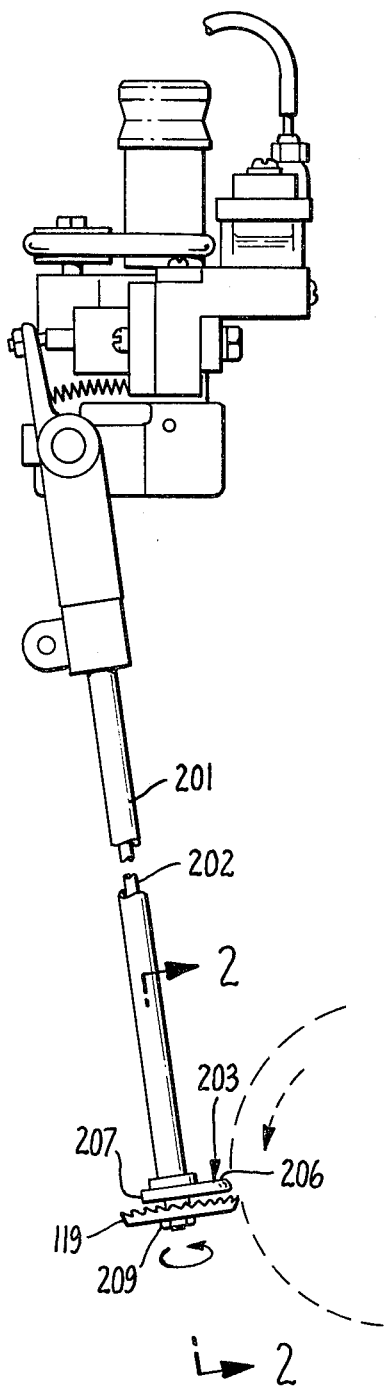
FIG. 1 is a side elevation partly in section showing the environment in which the live rotary knife assembly is utilized.
Figure 2:
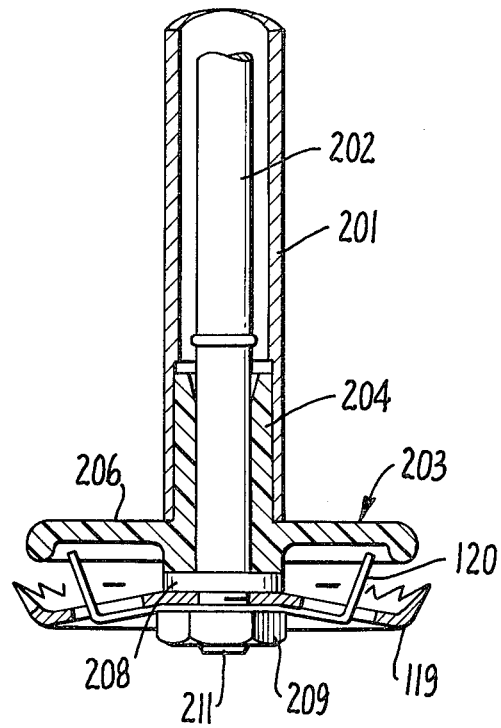
FIG. 2 is a section taken along the line 2—2 in FIG. 1.

Referring now to FIGS. 1 and 2, in accordance with this invention, shaft housing 201 is provided about the rotatable shaft 202, the shaft extending beyond the end of the housing 201. The guard structure generally indicated at 203 is molded of a suitable plastic such as polypropylene and fits snugly in the shaft housing 201 with an extension 204 providing a bearing for the shaft 202. The guard includes an outer peripheral portion 206 which extends generally over the entire knife, being cutaway as at 207 to permit peel to pass between the guard and the cutter 119. Between the guard 206 and the cutter 119 is a washer 208. The cutter and chip breaker 120 are held in place on the end of the shaft by a nut 209 which fits on the threaded end 211 of the shaft.

From the foregoing, it will be apparent that in place of the numerous elements shown in FIG. 3, the entire cutter and guard structure as shown in FIGS. 1 and 2 comprises cutter 119, chip breaker 120, nut 209, washer 208 and the guard structure 203. With the number of parts reduced so materially, the possibility of any buildup of dimensional tolerances between all the parts is reduced. Thus, the guard can be placed in a very exact position in relation to the cutter. With the number of parts reduced, the weight of the cutter assembly on the end of the shaft 202 is reduced materially so that any swinging action of the cutter is minimized. Thus, if the cutter assembly does swing, being of less weight, there is less momentum as it moves toward or away from the fruit.

I claim:

1. An improvement in a cutting mechanism which mechanism includes a shaft housing, a shaft positioned within the housing and extending outwardly of the housing at one end thereof, a rotary peeling knife mounted on the shaft one end for rotation with the shaft, a chip breaker mounted on the shaft one end and a guard mounted on the housing for cooperation with the cutter for adjusting the depth of a cut made by the cutter into a piece of fruit during a peeling operation, the improvement comprising:

a unitary guard having a planar portion, a guard rim surrounding said planar portion, said rim being arcuate and extending from said planar portion toward the cutter so that said guard rim closely follows an odd shaped portion of a fruit being peeled, a projection extending upwardly from said planar portion, said projection fitting snugly within the shaft housing so that rotation of said guard with respect to said housing is prevented, said projection having a bore defined therethrough which bore receives the shaft so that said extension provides a bearing for supporting the shaft within the housing, and means on said projection cooperating with means on the shaft for maintaining the shaft within the housing.

2. The improvement defined in claim 1 wherein said unitary guard includes a plastic material.

* * * * *